United States Patent [19]

Pate et al.

[11] 4,036,389
[45] July 19, 1977

[54] RETAINER CLIP AND SYNTHETIC RESIN BOX COMBINATION

[75] Inventors: Harold T. Pate; Richard J. Borsh, both of Cleveland, Ohio

[73] Assignee: Indian Head Inc., New York, N.Y.

[21] Appl. No.: 607,555

[22] Filed: Aug. 25, 1975

[51] Int. Cl.² .................. H02G 3/14; F16B 19/00; F16B 37/02
[52] U.S. Cl. .................................. 220/3.8; 85/36; 151/41.75
[58] Field of Search ............................. 220/3.2–3.94; 174/53; 85/36; 151/41.73, 41.75

[56] References Cited

U.S. PATENT DOCUMENTS

| | | | |
|---|---|---|---|
| 2,101,287 | 12/1937 | Tinnerman | 151/41.75 X |
| 2,149,719 | 3/1939 | Arnest | 85/36 X |
| 2,326,261 | 8/1943 | Shippee et al. | 85/36 X |
| 2,350,315 | 5/1944 | Kral | 85/36 X |
| 2,804,116 | 8/1957 | Van Niel et al. | 151/41.75 |
| 3,876,821 | 4/1975 | Pringle | 220/3.2 X |
| 3,895,732 | 7/1975 | Robinson et al. | 220/3.5 |
| 3,952,475 | 4/1976 | Paskert | 220/3.4 X |

FOREIGN PATENT DOCUMENTS 1,578,838  7/1969  France .................. 85/36

Primary Examiner—Stephen Marcus
Attorney, Agent, or Firm—William R. Laney

[57] ABSTRACT

A spring fastener of generally V-shaped configuration and including a first, substantially monoplanar leg joined to a second substantially monoplanar leg through a bend portion defining an acute angle of from about 43° to about 48°. The second leg defines a circular aperture therethrough, and the first leg has a tongue pressed out of a central portion thereof, and projecting toward said second leg at an acute angle to said first leg. The tongue projects a distance from the plane of the first leg, as measured normal to that plane, which is from about one-half to about two-thirds of the total distance of projection of said bend portion from the plane of the first leg, also as measured normal to the plane of said first leg.

The invention also includes and relates to fasteners of the type described in combination with a synthetic resin box which has an open side. The box carries a pair of the fasteners by having the described first leg of each fastener pressed into an accommodating slot in the box. The box further defines an elongated passageway adjacent each of the slots and extending parallel to the slot and the first leg of the respective fastener. The second leg of each fastener extends across the respective adjacent passageway at an acute angle to the axis of the respective passageway, and has the centrally located circular aperture therethrough aligned with the passageway axis.

5 Claims, 5 Drawing Figures

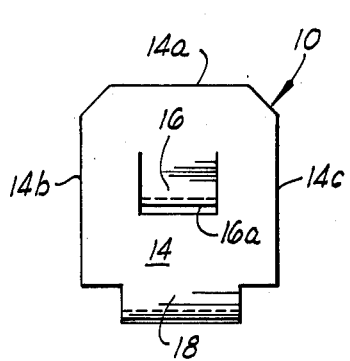
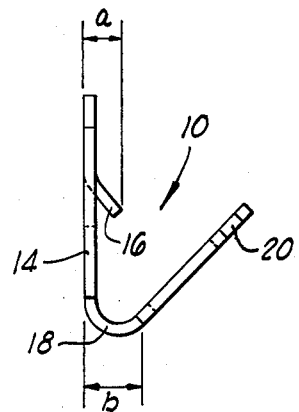
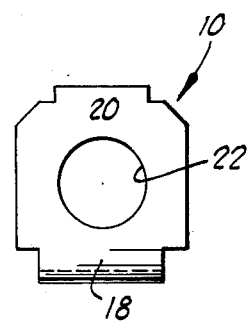
FIG. 2   FIG. 1   FIG. 3
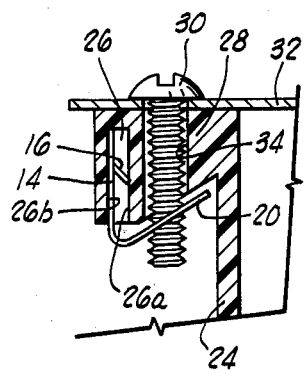
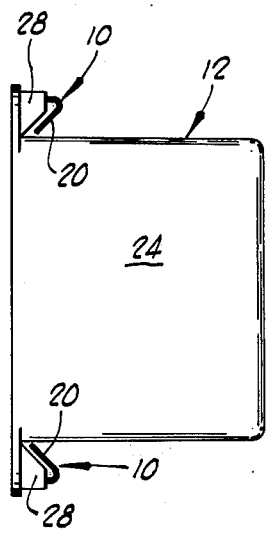
FIG. 5   FIG. 4

RETAINER CLIP AND SYNTHETIC RESIN BOX COMBINATION

BACKGROUND OF THE INVENTION

1. Field of the Invention

This invention relates to fastening devices, and more particularly to fastening devices which are particularly and specifically adapted for use in an open-sided synthetic resin box for receiving and retaining screws employed to secure a cover plate across the open side of the box.

2. Brief Description of the Prior Art

In United States patent application Ser. No. 528,007, entitled "Electrical Wall Box", and assigned to the assignee of the present application, an electrical wall box construction is disclosed in which a synthetic resin electrical wall box is formed to provide slots adjacent an open side of the wall box. Spring metal inserts are pressed into these slots, and function to receive and engage screws employed to secure a cover plate over the open side of the electrical wall box. The spring metal inserts utilized are of generally V-shaped configuration, having a pair of divergent legs joined through a bend, and further characterized in having a circular aperture formed in one of the legs, and a tongue pressed out of the other of the two legs. The leg which carries the tongue has a pair of lateral edge skirts or flanges which are bent out of the main plane of this leg of the insert, and function to assist in wedging this leg of the insert into the receiving slot formed in the synthetic resin wall box so as to retain the insert or fastener in position during use.

The metal insert or fastener illustrated and described in the co-pending application is further constructed so that the tongue which is pressed out of one leg of the V-shaped metal insert projects toward the other leg of the insert by a distance which is greater than the distance measured across the bent connecting portion utilized to connect the two legs of the insert. Stated differently, the tongue pressed out of the one leg of the metal insert projects a distance from the major plane of this one leg, as measured normal to this plane, which is always at least two-thirds of the distance which the legconnecting bend portion of the insert projects from the major plane of this one leg, also a measured in a direction normal to this major plane.

In the course of using the described spring metal inserts in electrical wall boxes having an open side, and for the purpose of engaging and retaining screws extended through the aperture formed in one of the legs of such inserts, it has been found that the pressure which is developed by the tine or tongue-bearing leg upon the synthetic resin of which such boxes are constructed tends to distort the resin over a short period of usage of the insert in the slot provided, with the result that the metal inserts become loose in the slots in a shorter period of time, and lose their effective screw-retaining ability. Moreover, as a result of the formation of the lateral edge skirts or flanges bent out of the major plane of the leg of the insert which is inserted in the box, the total surface area of this leg which is in contact with one side of the slot is reduced, further increasing the looseness of the clip in the slot following a short period of usage for screw retention.

It has also been experienced that the formation of these lateral edge skirts or flanges which are bent out of the major plane of the leg of the insert which is pressed into the slots in the box, causes a greater rigidity in the bend which interconnects the two legs of the insert than is desirable, in that the leg carrying the screw-receiving hole then cannot flex easily, and to the extent desired, when the screws are pressed into the hole in the insert so as to accommodate the screw, and achieve the ratcheting, screw-retaining action which must be accomplished by such metal inserts. Further, the inclusion of the bends at the flanges or skirts at the sides of the leg placed in the slot in the box appears to make the other screw-receiving leg more susceptible to permanent distortion from its initial angle when it is flexed away from this angle by the force of a screw being pressed through the aperture for purposes of engagement. Such permanent distortion results in poor screw engagement and retention, with subsequent looseness or eventual loss of the cover plate from the electrical wall box.

BRIEF DESCRIPTION OF THE PRESENT INVENTION

The present invention provides an improved spring metal fastener or clip for use in synthetic resin containers or boxes having an open side at one side thereof, and intended, in use, to be closed at this side by the fastening of a cover plate to the box by the use of screws. The fastener or clip of the invention exhibits better retention capability in slots formed in synthetic resin boxes for retention of one leg of the clip or fastener, and also achieves better flexinhg characteristics and less resistence to screw insertion, than clips of the type heretofore provided.

Broadly described, the spring metal fastener or clip of the invention is of generally V-shaped configuration and includes a first, substantially flat or monoplanar leg joined to a second substantially monoplanar leg through a bend portion defining an acute angle of from about 43° to about 48° with from about 45° to about 47° being the preferred angulation between the legs. One of the legs of the fastener defines a centrally located circular aperture, and the other leg has a tongue pressed out of a central portion of the leg and projecting from the plane of this second leg toward the leg which carries the circular apertures. The tongue which is pressed out of the second leg projects a total distance from the plane of this second leg, as measured normal to the plane of the second leg, which is from about one-half to about two-thirds of the total distance of projection of the bend portion of the fastener from this same plane of the first leg, also as measured normal to the plane of the first leg. The importance of this dimensioning in the fastener is to enable to fastener to be more suitable accommodated to, and stably received in, the slot formed in the synthetic resin box for the purpose of receiving the leg carrying the barb. More specifically, this dimensioning is important to avoid distortion of the synthetic resin as a result of excessive pressure being exerted by the barb or tongue against the synthetic resin when the fastener is pressed into the receiving slot.

It is also an important characteristic of the fastener of the invention that the leg which carries the tongue is entirely monoplanar in character, and is not provided with a pair of opposed edge skirts or flanges which are bent out of the major plane of this leg, as has been characteristic of prior fasteners of this general type. This arrangement provides a greater surface area of the leg inserted into the slot which will contact the plastic surface defining one side of the slot, and thus provides better retention and obviates the development of looseness of the fastener in the slot over extended periods of usage. The elimination of the bends necessary to form lateral skirts or flanges out of the major plane of the one leg which carries the tongue avoids work hardening which extends through the curved bend of the fastener and into a portion of the second leg, so that the flexing properties of the second leg, when engaging a screw passed through the aperture therein, is more suitable to placement of the screws and their long-term retention over extended periods of usage of the fasteners in retaining a cover plate in position.

An important object of the present invention is to provide an improved spring metal fastener for use in conjunction with slotted synthetic resin boxes for engaging and retaining screws employed to secure a cover plate over the open side of such boxes.

A more specific object of the invention is to provide a spring metal fastener or clip which can be stably and firmly retained in accommodating slots provided in synthetic resin boxes, and particularly polyvinyl chloride boxes, where such fasteners or clips are used to engage the threads of elongated screws of uniform shank diameter when such screws are employed to retain a cover plate over an open side of such synthetic resin boxes.

A further and additional object of the invention is to provide a spring metal fastener or clip which includes a leg having an aperture therethrough for the accommodation of the threaded shank of a screw, which leg can undergo flexing and distortion (as the screw is inserted therethrough) without permanent change of shape and distortion after undergoing flexing to permit insertion of the screw.

A further and additional object of the present invention is to provide an improved synthetic resin box and spring metal screw-retaining fastener combination, which box has an open side adapted to be closed by a cover plate secured to the open side by screws extended through, and engaging, the spring metal fasteners.

In addition to the foregoing described objects and advantages of the invention, additional objects and advantages will become apparent as the following detailed description of a preferred embodiment of the invention is read in conjunction with the accompanying drawings which illustrate the invention.

GENERAL DESCRIPTION OF THE DRAWINGS

FIG. 1 is a side elevation view of a spring metal fastener constructed in accordance with the present invention.

FIG. 2 is a view in elevation of the spring metal fastener shown in FIG. 1 as the fastener appears when rotated 90° from its position shown in FIG. 1, and showing the elevational appearance of one of the monoplanar legs of the fastener.

FIG. 3 is a side elevation view of the spring metal fastener shown in FIG. 1 as it appears when rotated through 90° to show, in elevation, the other of the two legs of the fastener.

FIG. 4 is a view in side elevation of a synthetic resin electrical wall box having the spring metal fasteners of the present invention secured thereto for the purpose of receiving screws to hold a cover plate (not shown) over an open side of the wall box.

FIG. 5 is a detailed view showing, in detail, partly in section and partly in elevation, the slotted portion of the box which receives one of the spring metal fasteners, and the manner in which this fastener cooperates with a screw utilized to hold a cover plate over the open side of the box.

DETAILED DESCRIPTION OF A PREFERRED EMBODIMENT OF THE INVENTION

In the drawings, the spring metal fastener of the invention is designated generally by reference numberal 10. The fastener 10 is illustrated in FIGS. 4 and 5 as it may typically appear when used in a synthetic resin electrical wall box 12. The spring metal fastener 10 includes a first substantially monoplanar leg 14, and it will be perceived in referring to FIG. 1 that the leg 14 of the fastener is a flat plate occupying a single plane, except for the extension therefrom of a tongue 16. The fastener is formed as an integral unit from a spring metal material, and the leg 14 is formed in the shape shown by cutting or stamping, with the tongue 16 being pressed out of this leg at an acute angle. The tongue 16 is of generally rectangular configuration and has a free edge 16a thereon which extends substantially parallel to the plane of the leg 14. The leg 14 has an end edge 14a which projects normal to a pair of side legs 14b and 14c. The corners of the leg are cut away as illustrated in FIG. 2. As further clearly illustrated in FIG. 2, side edges 14b and 14c will each intersect a line coincident with end edge 14a. Side edges 14b and 14c are also clearly illustrated as being free edges.

At its side opposite the end edge 14a, the leg 14 is connected to one end portion of a bight or bend portion 18 which interconnects the leg 14 with a second monoplanar leg 20. The second monoplanar leg 20 is, like the first leg 14, flat metal plate, which has formed in a central portion thereof, a large circular aperture or opening 22. It will be perceived in referring to FIG. 1 and 3 that the bight or bend portion 18 is of lesser width than each of the legs 14 and 20, and that the legs are joined to each other through the bend portion so as to project at an acute angle with respect to each other, and more specifically at an angle of between about 43° and about 48°. Preferably, the angle formed by the legs with each other through the interconnecting bend portion is between 45° and 47°.

In referring to FIG. 1, it will be perceived that the tongue 16 projects from the leg 14 toward the leg 20 in a manner such that the farthest portion of the tongue from the leg 14 is located a distance from this leg, as measured normal to the plane of the first leg, which is about one-half to about two-thirds of the total distance of projection of the bight or bend portion 18 of the fastener from this same plane of the first leg, also as measured normal to such plane. These relative dimensions are indicated by the lines a and b in FIG. 1.

The spring metal fastener 10 is utilized, as previously discussed, for the purpose of securing a cover plate over the open side of a synthetic resin box. In so functioning, the fastener is mounted on, or secured in the box, and engages the threads on the shank of a bolt or screw extended through the aperture 22 formed in the leg 20. One way in which the spring metal fastener is mounted in a synthetic resin box to function in the manner described is illustrated in FIGS. 4 and 5 of the drawings. The synthetic resin box 12 there illustrated includes one or more side walls 24 which define a hollow interior opening at the side of the box 12 which faces to the left in the drawings. This open side of the box 12, in ordinary usage, is to be closed by some type of a cover plate after electrical terminals or other similar connections are installed inside the box.

In the embodiment of the invention illustrated in FIGS. 4 and 5, wherein the box is used in combination with the spring metal fastener subcombination of the invention, the spring metal fastener 10 is mounted in the box by pressing the leg 14 and the tongue 16 which projects therefrom into an accommodating slot 26 molded in the synthetic resin from which the box is constructed. For convenience of illustration, two of the slots 26 have been formed in the type of box 12 here shown in a pair of lugs or ears 28 which project outwardly fromm the side walls 24 of the box 16 at a location immediately adjacent the open side thereof.

It will be perceived that as the fasteners 10 are inserted in the slots 26, they are pressed into the slots so that the tongue 16 on the fastener bears against one side wall 26a of the slot, and the flat or planar surface on the opposite side of the monoplanar leg 14 from the tongue 16 bears flatly against the opposite side 26b of the slot. The full surface area of the monoplanar leg 14 thus bearing against the flat wall formed by this latter side of the slot 26.

In FIG. 5 of the drawing, the fastener 10, as used in conjunction with a machine screw 30, is illustrated as the assembly is employed to retain across the open side of the wall box 12, a cover plate 32. It will be noted that the screw 30 has the shank portion thereof extended through an elongated generally cylindrical passageway 34 formed through the respective lug 28, and it will be further noted that the monoplanar leg 20 projects across the axis of the passageway so that this axis extends through the center of the circular aperture 22. The threaded shank of the screw 30 thus passes through the aperture 22 and becomes engaged with the portions of the monoplanar leg 20 which define the aperture 22. Upon initial contact by the screw 30, the leg 20 is distorted slightly from its at-rest, engaging position shown in FIG. 5. Once the threads of the screw commence to engage the side edges of the aperture 22, however, the leg 20 is pulled back to its atrest position and continues to engage the threads of the screw at axially offset locations therealong.

The construction of the fastener 10 assures that the fastener can be slightly distorted to afford easy engagement with the shank of the screw without undue pressure being required by the coverinstalling workmen, and yet also assures sufficient flexibility and sufficient elastic memory in the engaged leg that it will return substantially to its relaxed or unstressed position after the screw threads become engaged. Moreover, the manner of forming the leg 14 in a flat, monoplanar shape assures both that the optimum flexibility will be characteristic of the bight portion 18, and that maximum tightness of the leg 14 and tongue 16 in the slot 26 over extended period of usage will be achieved without distortion of the synthetic resin.

Although a preferred embodiment of the invention has been herein described in order to clearly illustrate the principles of operation and the manner of construction of the invention, it is to be understood that some change and innovation can be made in the box assembly without departure from the basic principles underlying the invention. For example, though one type of electrical wall box has been illustrated in the drawings in combination with the fastener of the invention, other types and shapes of boxes can be so utilized, and the slots which receive the fasteners can be changed in their particular mode of formation and location in the box. Thus, the slots might be formed in thickened walls of various shapes of boxes, and the screw-receiving passageways simply drilled into these walls to a depth sufficient to accommodate the shank of the screw, with concomitant formation of the slot to receive the second leg of the fastener. All innovations and changes of this type, which do not depart from the basic principles of the invention as herein described are considered to be circumscribed by the spririt and scope of the invention, except as the same may be necessarily limited by the appended claims or reasonable equivalents thereof.

What is claimed is:

1. A spring metal fastener of generally V-shaped configuration comprising:
   a first flat, substantially monoplanar leg having a first end edge and two side edges, each side edge intersecting a line coincident with said end edge, said side edges being free edges;
   a second flat, substantially monoplanar leg having an opening formed therethrough and disposed centrally therein;
   a bend portion joining one end of said first leg to one end of said second leg and reverse bent through an angle of from about 132° to about 137° to define an acute angle between said first and second legs of from about 43° to about 48°; and
   a tongue pressed out of the central portion of said first leg and projecting in a plane which extends toward said second leg at an angle to the plane of said first leg, said tongue projecting a distance from the plane of said first leg, as measured normal to that plane, which is from about one-half to about two-thirds of the total distance of projection of said bend portion from the plane of said first leg, also as measured to the plane of said first leg.

2. A spring metal fastener as defined in claim 1 where said tongue is substantially rectangular in shape, and has a free edge extending parallel to the planes of said first and second legs.

3. In combination,
   a synthetic resin box having wall means defining a hollow interior and defining an opening at one side of said box, said wall means defining a slot adjacent said opening at one side of box and further defining an elongated screw passage way having an axis extending parallel to said slot, a portion of said wall means separating said slot from said passageway; and
   a spring metal fastener mounted in said wall means and including:
   a first flat, substantially monoplanar leg having a first end edge of two side edges, each side edge intersecting a line coincident with said end edge, said side edges being free edges; said first leg being positioned in said slot with the plane thereof extending substantially parallel to the axis of said elongated screw passageway, and with one flat side first leg bearing against one side of said slot;
   a tongue pressed out of said first leg at an acute angle to the plane thereof and resiliently bearing against the second side of said slot;
   a second flat, substantially monoplanar leg having a central opening therethrough, which opening has its center aligned with the axis of said elongated screw passageway; and
   a bend portion joining one end of said first leg to one end of said second leg and reverse bent through an angle of from about 132° to about 137° to define an acute angle between said legs of from about 43° to about 48°, said bend portion bridging across said portion of said wall means separating said slot from said passageway.

4. The combination defined in claim 3 wherein said tongue projects a distance from the plane of said first leg, as measured normal to that plane, which is from about one-third to about two-thirds of the total distance of projection of said bend portion from the plane of said first leg, also as measured normal to the plane of said first leg.

5. The combination defined in claim 3 and further characterized as including a screw having an elongated threaded shank positioned in said screw passageway and extending through the central opening in said second monoplanar leg with the threads on said screw shank engaged by the portions of said leg defining the central opening therethrough at points spaced axially along said threaded screw shank.

* * * * *

UNITED STATES PATENT OFFICE
CERTIFICATE OF CORRECTION

Patent No. 4,036,389　　　　　　　　Dated July 19, 1977

Inventor(s) Harold T. Pate and Richard J. Borsh

It is certified that error appears in the above-identified patent and that said Letters Patent are hereby corrected as shown below:

Column 1, line 45, change "legconnecting" to --leg-connecting-- ;

Column 1, line 61, before "in the box" insert --in the slot-- ;

Column 2, line 29, change "flexinhg" to --flexing-- ;

Column 4, line 22, change "legs" to --edges-- ;

Column 5, line 11, change "fromm" to --from-- ;

Column 5, line 20, change "bearing" to --bears-- ;

Column 5, line 39, change "atrest" to --at-rest-- ;

Column 5, line 45, change "coverinstalling" to

--cover-installing-- ;

UNITED STATES PATENT OFFICE
CERTIFICATE OF CORRECTION

Patent No. 4,036,389　　　　　　　　Dated July 19, 1977

Inventor(s) Harold T. Pate and Richard J. Borsh

It is certified that error appears in the above-identified patent and that said Letters Patent are hereby corrected as shown below:

Column 6, line 28, before "angle" insert --acute-- ;

Column 6, line 34, before "to the plane" insert --normal-- ;

Column 6, line 51, change "of" to --and-- ;

Column 6, line 56, after "side" insert --of said-- .

Signed and Sealed this

Sixth Day of December 1977

[SEAL]

Attest:

RUTH C. MASON　　　　　　　　LUTRELLE F. PARKER
*Attesting Officer*　　　*Acting Commissioner of Patents and Trademarks*